United States Patent
Chang et al.

(10) Patent No.: US 11,352,126 B2
(45) Date of Patent: Jun. 7, 2022

(54) MITIGATING TRANSONIC SHOCK WAVE WITH PLASMA HEATING ELEMENTS

(71) Applicant: Lockheed Martin Corporation, Bethesda, MD (US)

(72) Inventors: Ming Chang, Santa Clarita, CA (US); Sergey Macheret, Palmdale, CA (US); Joseph Vadyak, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 267 days.

(21) Appl. No.: 16/381,825

(22) Filed: Apr. 11, 2019

(65) Prior Publication Data

US 2019/0241254 A1    Aug. 8, 2019

Related U.S. Application Data

(63) Continuation of application No. 13/156,317, filed on Jun. 8, 2011, now abandoned.

(51) Int. Cl.
*B64C 23/00* (2006.01)

(52) U.S. Cl.
CPC ........ *B64C 23/005* (2013.01); *B64C 2230/12* (2013.01); *Y02T 50/10* (2013.01)

(58) Field of Classification Search
CPC ............................ B64C 23/005; Y02T 50/166
See application file for complete search history.

(56) References Cited

U.S. PATENT DOCUMENTS

| | | | | |
|---|---|---|---|---|
| 4,867,396 A | * | 9/1989 | Wainfan | B64C 3/14 244/215 |
| 6,134,959 A | | 10/2000 | Mangalam et al. | |
| 6,484,971 B2 | | 11/2002 | Layukallo | |
| 6,513,754 B1 | | 2/2003 | Grove | |
| 6,570,333 B1 | * | 5/2003 | Miller | B64C 23/00 315/111.21 |
| 6,682,301 B2 | | 1/2004 | Kuhne | |
| 6,805,325 B1 | * | 10/2004 | Malmuth | B64C 21/00 244/205 |
| 6,905,091 B2 | | 6/2005 | Berson et al. | |

(Continued)

FOREIGN PATENT DOCUMENTS

| | | |
|---|---|---|
| DE | 1020060064 | 9/2007 |
| DE | 102006028614 | 1/2008 |
| EP | 1219537 | 7/2002 |

OTHER PUBLICATIONS

Haering, Jr. et al., "Airdata Measurement and Calibration," NASA Technical Memorandum 104316: pp. 1-19, Dec. 1995.

(Continued)

*Primary Examiner* — Michael H Wang
(74) *Attorney, Agent, or Firm* — Baker Botts L.L.P.

(57) ABSTRACT

Systems and methods for enhancing operations of an aircraft may include a plasma generator, a sensor, and a controller. The plasma generator may be positioned on an exterior of the aircraft such that it can provide localized heating thereon. The sensor may be configured to sense and transmit information regarding a transonic flight condition such as speed to the controller. The controller may be configured to activate the plasma generator in response to information from the sensor, so as to mitigate a transonic shock wave through localized heating.

17 Claims, 5 Drawing Sheets

(56) References Cited

U.S. PATENT DOCUMENTS

| | | | |
|---|---|---|---|
| 7,121,511 B2 | 10/2006 | Kremeyer | |
| 7,363,809 B2 * | 4/2008 | Miller | G01C 21/005 73/170.02 |
| 7,407,131 B1 | 8/2008 | Corda et al. | |
| 7,641,153 B2 | 1/2010 | Smereczniak | |
| 8,006,939 B2 | 8/2011 | McClure et al. | |
| 8,196,871 B2 * | 6/2012 | Murray | F01D 5/16 244/204 |
| 8,220,753 B2 | 7/2012 | Silkey et al. | |
| 2003/0233931 A1 | 12/2003 | Nemtsev | |
| 2004/0011917 A1 | 1/2004 | Saeks et al. | |
| 2004/0118793 A1 | 6/2004 | Burke | |
| 2004/0195462 A1 * | 10/2004 | Malmuth | B64C 21/00 244/205 |
| 2008/0023589 A1 * | 1/2008 | Miles | H05H 1/2406 244/205 |
| 2008/0067283 A1 | 3/2008 | Thomas | |
| 2008/0116808 A1 * | 5/2008 | McClure | H05H 1/54 315/111.61 |
| 2008/0140316 A1 * | 6/2008 | Masson | G01C 21/16 701/510 |
| 2009/0173837 A1 * | 7/2009 | Silkey | F15D 1/12 244/205 |
| 2009/0212164 A1 * | 8/2009 | Osborne | B64C 23/005 244/205 |
| 2010/0004799 A1 * | 1/2010 | Drouin, Jr | H05H 1/2406 701/3 |
| 2010/0123046 A1 * | 5/2010 | Khozikov | H05H 1/2406 244/200.1 |
| 2010/0133386 A1 * | 6/2010 | Schwimley | F15D 1/12 244/205 |
| 2010/0329838 A1 * | 12/2010 | Greenblatt | H05H 1/2406 415/1 |
| 2011/0048025 A1 * | 3/2011 | Ginn | F02K 1/46 60/770 |
| 2012/0193483 A1 * | 8/2012 | Essenhigh | B64C 23/005 244/205 |

OTHER PUBLICATIONS

Bivolaru, et al., "Observation of supersonic shock wave mitigation by a plasma aero-spike," Physics of Plasmas, pp. 721-723, vol. 9, No. 2, dated Feb. 2002.

* cited by examiner

MITIGATING TRANSONIC SHOCK WAVE WITH PLASMA HEATING ELEMENTS

STATEMENT AS TO RIGHTS TO INVENTIONS MADE UNDER FEDERALLY SPONSORED RESEARCH OR DEVELOPMENT

Not Applicable.

FIELD

The present invention generally relates to transonic shock wave mitigation and, in particular, relates to the use of plasma generators to mitigate the formation of transonic shock wave in an aircraft.

BACKGROUND

Aerodynamicists are keenly aware of the dramatic drag rise associated with transonic flight. A limitation in transonic flight operations is the localized transonic shock formation due to surface flows approaching sonic speeds. Typically, a dramatic drag increase, termed "drag rise" is associated with these localized transonic shock formations. The drag rise results from the transonic shock induced boundary layer separation and increased pressure drag. For high-speed aircraft, such as transport aircraft, this dramatic drag rise may become a limiting barrier for optimal cruise performance. This is especially true if the engine's optimal fuel burn rate is beyond the drag rise Mach number, termed "drag divergence Mach number." Some attempts to resolve this limitation have involved either oversizing the aircraft to carry extra fuel to compensate for the drag, or oversizing the engines to counter the increased drag. However, engine technology may not be adequate to provide the thrust to counter the associated drag rise in a cost-effective manner, and resulting vehicles are either non-optimal, or costly to operate. Other attempts to mitigate drag have included providing area ruling and anti-shock bodies. The principle of drag reduction via a smooth cross-sectional area transition from the vehicle nose to tail may be complex and/or costly in terms of weight impact and off-design skin friction drag increases.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The present disclosure provides systems and methods for enhancing operations of an aircraft. The system may include a plasma generator, a sensor, and a controller. The plasma generator may be positioned on an exterior of the aircraft such that it can provide localized heating thereon. The sensor may be configured to sense and transmit a variety of information regarding a transonic flight condition such as speed to the controller. The controller may be configured to activate the plasma generator in response to information from the sensor, so as to mitigate a transonic shock wave through localized heating.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

Transonic shock formation may be dependent on local temperature, pressure, and velocity. Thus, a mechanism that can alter the flow conditions locally may cause flow to remain locally subsonic, significantly reducing adverse effects of transonic shock on vehicle performance. More particularly, lightweight plasma heating elements integrated onto the surface of an aircraft near known transonic shock formation sites may eliminate or delay transonic shock formation.

Figure 1:
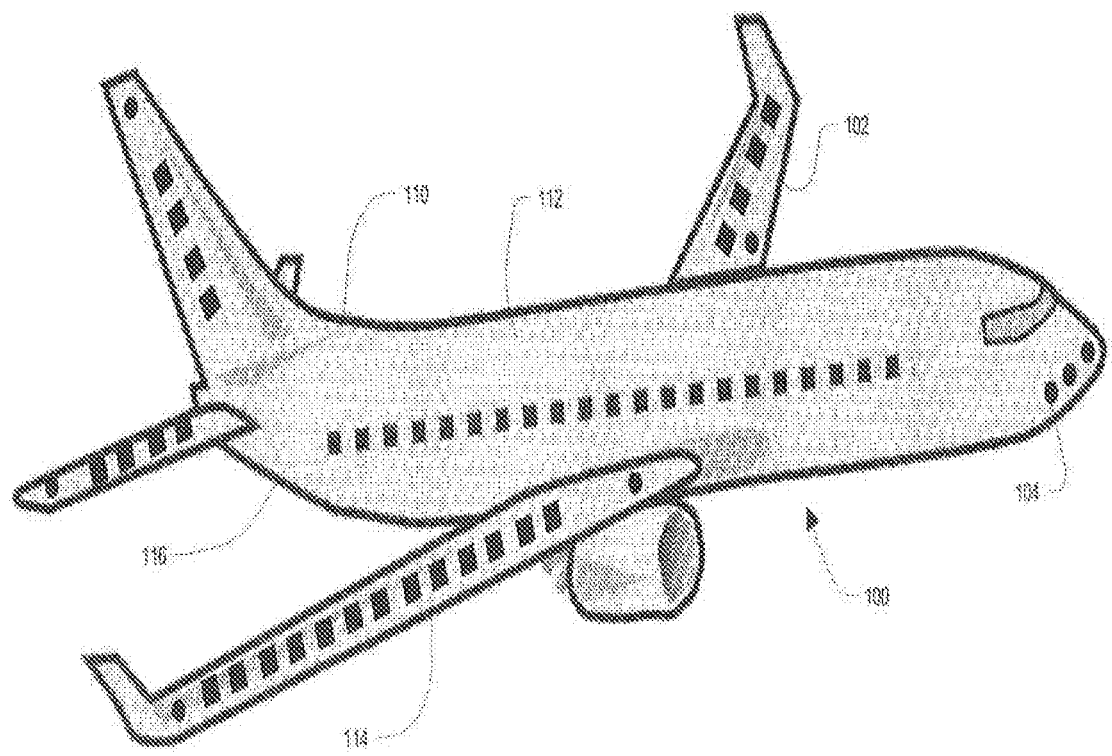
FIG. 1 is a perspective of an aircraft having a transonic shock wave mitigating system in accordance with one aspect of the present disclosure.
Figure 3:
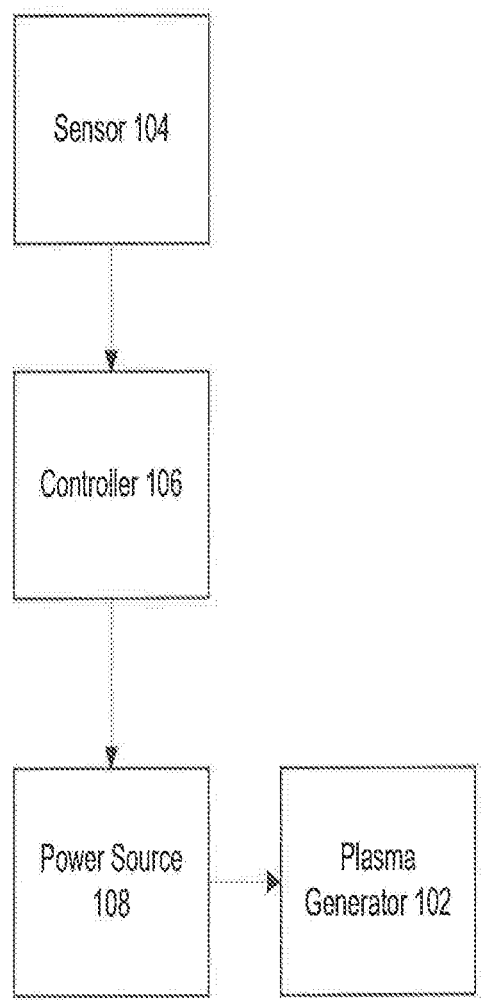
FIG. 3 illustrates a schematic diagram of a transonic shock wave mitigating system in accordance with one aspect of the present disclosure.

Referring to FIG. 1, a system for enhancing operations of an aircraft 100 may include a plasma generator 102, a sensor 104, a controller 106 (shown in FIG. 3), and a power source 108 (shown in FIG. 3). The sensor 104 may sense information regarding a transonic flight condition and transmit the information regarding the transonic flight condition to the controller 106. The information sensed by the sensor 104 may include any number of variables, such as speed, altitude, temperature, angle of attack, attitude, or any other indicator that the aircraft 100 is approaching transonic or supersonic flight. Upon determination that a transonic flight condition is present, the controller 106 may activate the plasma generator 102 in response to the information transmitted from the sensor 104 regarding the transonic flight condition. The activation of the plasma generator 102 may reduce the intensity of, modify the location of, or otherwise mitigate a transonic shock wave. In some aspects, activation of the plasma generator 102 may include providing power from a power source 108 to the plasma generator 102. Activation of the plasma generator 102 may include a binary function, such as turning the plasma generator 102 on or off. Alternatively, or additionally, activation of the plasma generator 102 may include a variable function, such as adjusting the intensity of the energy provided by the plasma generator 102.

Figure 2A:
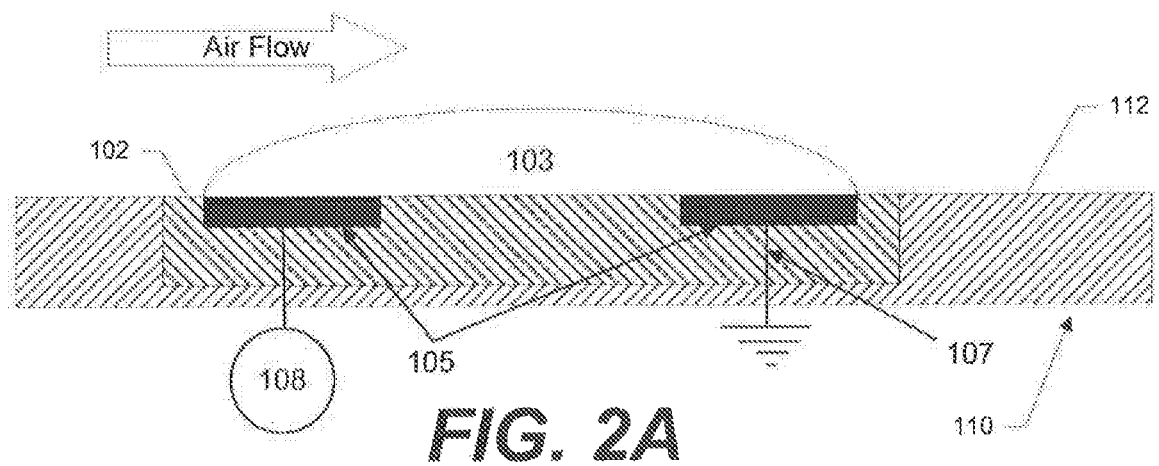
FIG. 2A illustrates a side view of a plasma generator in accordance with one aspect of the present disclosure.
Figure 2B:
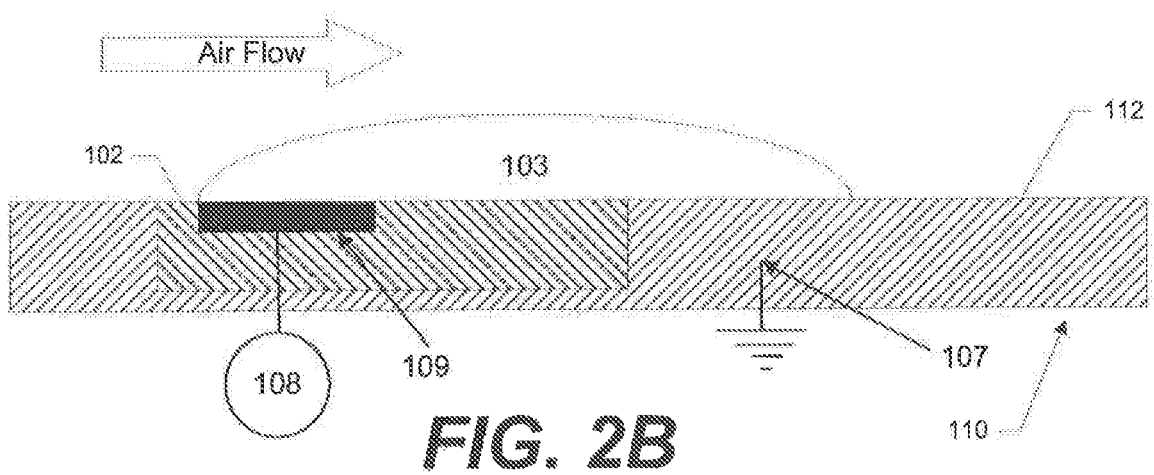
FIG. 2B illustrates a side view a plasma generator in accordance with another aspect of the present disclosure.
Figure 2C:
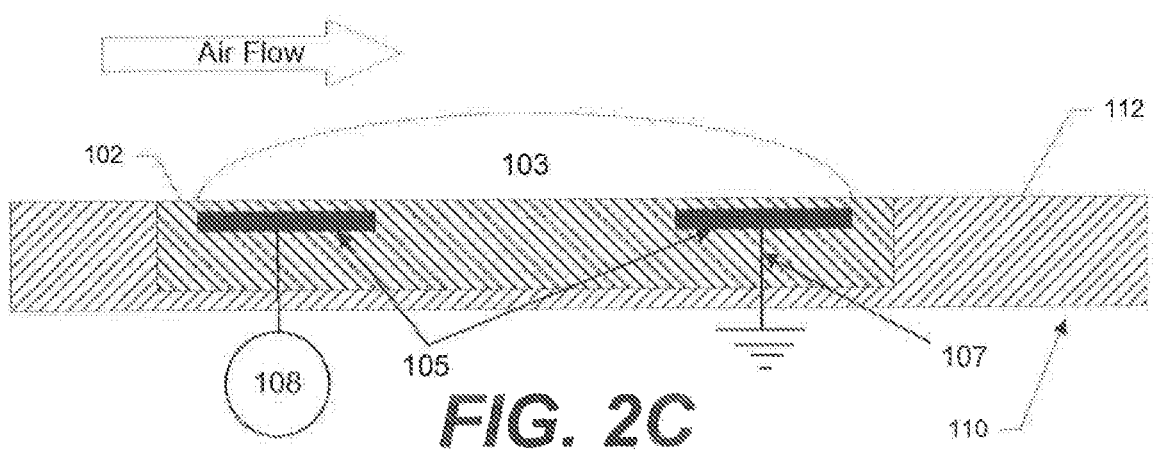
FIG. 2C illustrates a side view of a plasma generator in accordance with yet another aspect of the present disclosure.

Referring to FIGS. 2a, 2b, and 2c, the plasma generator 102 may be any of a number of different types of units for generating heat via plasma and/or providing a layer of weakly ionized plasma 103. Thus, the local speed of sound may be locally altered at the plasma generator 102, allowing for changes in strength, and location of a transonic shock wave under particular flight conditions. The plasma generator 102 may be any source of plasma 103, such as a set of electrodes 105 (illustrated in FIG. 2a) that receive power from the power source 108 and ignite or arc when the voltage reaches a threshold value. One of the set of electrodes 105 may communicate with a ground connection 107. Other plasma generator examples may use a single electrode 109 (illustrated in FIG. 2b), or may include, but are not limited to inductively coupled radio frequency discharge, and capacitively coupled radio frequency discharge. When powered, the electric current flowing through the plasma may result in Joule dissipation inducing a local heating to the surrounding air, changing the local temperature and pressure conditions. Such flowfield change may increase the local sonic speed, effectively reducing the local Mach number to a subsonic regime and eliminating the transonic shock at a particular transonic condition. The plasma generator 102 may thus mitigate transonic shock or shocks, while being electronically controlled and driven, without moving parts. The plasma generator 102 may be on an exterior 110 of the aircraft 100. In some aspects, the plasma generator 102 may be flush with an exterior surface 112 of the aircraft 100 (as illustrated in FIGS. 2a and 2b). Alternatively, the plasma generator 102 may be recessed in the exterior surface 112 of the aircraft 100 (as illustrated in FIG. 2c). Referring back to FIG. 1, depending on the particular aircraft 100, the particular expected flight conditions, and other variables, the plasma generator 102 may sit on a wing 114 of the aircraft 100, on the fuselage 116 of the aircraft 100, or elsewhere. The plasma generator 102 may be adaptive, requiring use only when transonic shock wave formation conditions are present, conserving power and reducing life cycle cost of the plasma generator 102. In some aspects, one or more additional plasma generators may be used in conjunction with the plasma generator 102. The use of multiple switchable plasma generators may enable adaptation of the individual plasma generators to different flight conditions, thus making the system tunable within a broad range of flight conditions. The additional plasma generators may be similar or even identical to the plasma generator 102. The various plasma generators may be grouped in clusters, and may be activated either individually, or the plasma generators in a given cluster may be activated together. Thus, any number of plasma generators may be used in any of a variety of configurations to mitigate a transonic shock wave or otherwise enhance operations of the aircraft 100.

The sensor 104 may be configured to sense and transmit information regarding at least one transonic flight condition, such as speed, altitude, temperature, angle of attack, attitude, etc. In some aspects, the sensor 104 may be configured to sense multiple transonic flight conditions, either simultaneously, or in turn. In other aspects, the sensor 104 may sense only a single unique transonic flight condition. The sensor 104 may be part of preexisting systems of the aircraft 100, or the sensor 104 may be used primarily in conjunction with the plasma generator 102. The sensor 104 may be inside the aircraft 100, outside or on the exterior 110 of the aircraft 100, or elsewhere. In some aspects, one or more additional sensors may be used in conjunction with the sensor 104. The additional sensors may be similar or even identical to the sensor 104, and may thusly be configured to sense and transmit information regarding one or more transonic flight conditions. Thus, any number of sensors may be used to sense and transmit any of a number of flight variables useful in enhancing operations of the aircraft 100.

Referring now to FIG. 3, the controller 106 may be configured to activate the plasma generator 102 in response to information transmitted from the sensor 104 regarding the transonic flight condition. In some aspects, the controller 106 may be configured to process information from the sensor 104 to determine whether activation of the plasma generator 102 would mitigate a transonic shock wave or otherwise enhance operations of the aircraft 100. If the controller 106 determines that activation of the plasma generator 102 would mitigate a transonic shock wave, the controller 106 may transmit a signal to the power source 108 to provide power to the plasma generator 102. In some aspects, the controller 106 may be configured to process the information from the different sensors 104, to determine the flowfield conditions around the aircraft 100. The controller 106 may be configured to determine the optimal plasma generation condition that will provide the following: mitigated transonic shock wave, improved aerodynamic efficiency, reduced noise, allowance for overspeed operations. The benefits to the aircraft 100 may include improved fuel efficiency, improved range, a larger payload capacity and improved lift to drag ratio. Alternatively, the enhanced condition may include a configuration that focuses on a particular optimal plasma generation condition to achieve a single benefit with little or even no emphasis on the others. After the controller 106 determines whether the plasma generator 102 would be activated in the optimal condition, it may activate the plasma generator 102 to provide the optimal condition. When multiple plasma generators are present, the controller 106 may be configured to determine whether each plasma generator would be activated in the optimal configuration, and may activate only those plasma generators that would be activated in the optimal configuration, while de-activating those plasma generators that would be de-activated in the optimal configuration. Depending on the number and configuration of plasma generators, the controller 106 may be configured to activate the plasma generators independently of one another and/or in groups or clusters. Such clusters may be associated with different portions of the aircraft 100, such as various portions of the wing 114, or fuselage 116. Further, the controller 106 may have error correction functionality, allowing the controller 106 to filter information from multiple sensors to determine whether some sensors are unreliable. The controller 106 may also include a feedback loop to analyze which transonic flight conditions are most closely associated with enhancing flight operations.

The power source 108 may be energy source configured to provide power to the plasma generator 102. For example, the power source 108 may be either an alternating current (AC) or a direct current (DC) source. In some aspects, the power source 108 may be an auxiliary power source of the aircraft 100. In other aspects, the power source 108 may be the primary power source of the aircraft 100. The power source 108 may provide power in a binary manner, to turn the plasma generator 102 "on" or "off." Alternatively, or additionally, the power source may provide variable or adjustable voltage or current, to allow the plasma generator 102 to have a variable output. Wiring may run through the interior of the wing 114 and may connect the power source 108 to the plasma generator 102.

While shown and generally described as a winged transport vehicle, the aircraft 100 may be any kind of aircraft, including, but not limited to transport vehicles, unmanned aircraft, rockets, helicopters, and the like.

Figure 4:
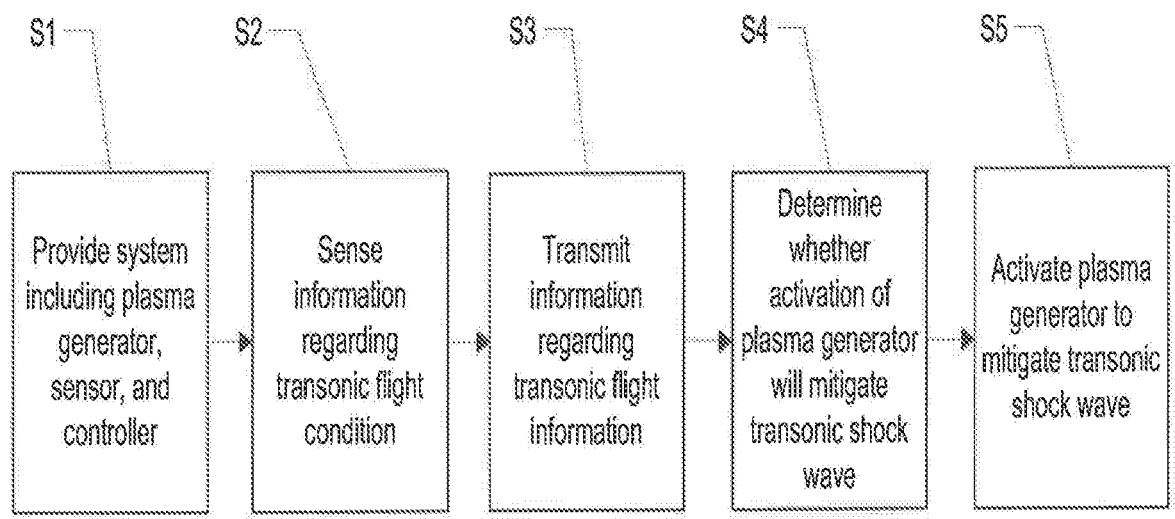
FIG. 4 illustrates a method of mitigating transonic shock in accordance with one aspect of the present disclosure.

Some methods for enhancing operations of the aircraft 100 are illustrated in FIG. 4. At step S1, a system including various elements may be provided. The system may include the plasma generator 102 on an exterior 110 of the aircraft 100, the sensor 104 configured to sense and transmit information regarding a transonic flight condition, and the controller 106 configured to activate the plasma generator 102 in response to information transmitted from the sensor 104 regarding the transonic flight condition. The system may also include the power source 108 configured to provide power to the plasma generator 102. At step S2, the sensor 104 may sense the information regarding the transonic flight condition, such as speed, altitude, temperature, angle of attack, attitude, etc. At step S3, the sensor 104 may transmit the information regarding the transonic flight information to the controller 106. At step S4, the controller 106 may determine, based on the information regarding the transonic flight condition, whether activation of the plasma generator 102 will mitigate a transonic shock wave. At step S5, upon determination that activation of the plasma generator 102 will mitigate a transonic shock wave, the controller 106 activates the plasma generator 102, to mitigate the transonic shock wave. Activation of the plasma generator 102 may involve transmitting a signal from the controller 106 to the power source 108 to provide power to the plasma generator 102. The process may be repeated dynamically, allowing for in-flight adjustment, as conditions change. Because the system can be electrically controlled and adaptively switched in real-time, operations of the aircraft 100 may be enhanced by quickly tuning the adaptive system in response to current flight conditions to modify wing incidence, reduce fuel burn, or otherwise enhance operations.

When multiple sensors or plasma generators are utilized, the controller 106 may simultaneously or serially communicate with each. Thus, the steps of sensing and transmitting may include sensing with any, some, or all sensors, transmitting with any, some, or all sensors, and transmitting to any, some, or all plasma generators. Likewise, the information transmitted may vary depending on the components used and the variables measured.

In some aspects, methods for enhancing operations of the aircraft 100 also involve a determination by the controller 106 of an optimal configuration. The optimal configuration may be a transonic shock wave mitigating configuration, optimizing the mitigation of a transonic shock wave. However, a balanced condition may be desirable that simultaneously mitigates a transonic shock wave, while also enhancing flight operations in other ways. For example, it may be desirable to mitigate, but not eliminate, a transonic shock wave while improving aircraft 100 lift to drag ratio (i.e., a fuel efficiency optimizing configuration). Depending on the parameters of the flight, the optimal configuration may set a minimum threshold for transonic shock wave mitigation and improve lift to drag ratio, or vice versa. The controller 106 may calculate the optimal configuration, based on variables or other information relating to the optimization. Once the controller 106 determines that the plasma generator 102 is activated in the optimal configuration, the controller 106 may activate the plasma generator 102 such that the operation approaches the optimal condition.

Figure 5:
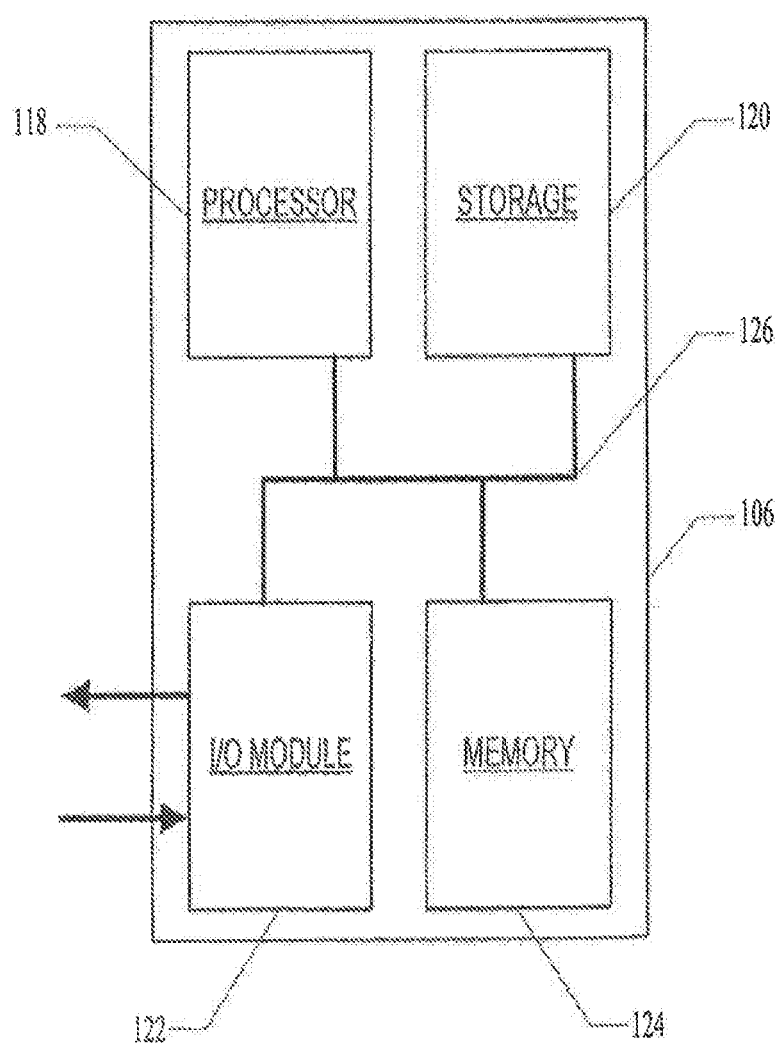
FIG. 5 illustrates a block diagram of a controller in accordance with one aspect of the present disclosure.

FIG. 5 is a block diagram illustrating components of the controller 106, in accordance with various aspects of the subject disclosure. The controller 106 may comprise a processor module 118, a storage module 120, an input/output (I/O) module 122, a memory module 124, and a bus 126. The bus 126 may be any suitable communication mechanism for communicating information. The processor module 118, storage module 120, I/O module 122, and memory module 124 may be coupled with bus 126 for communicating information between any of the modules of the controller 106 and/or information between any module of the controller 106 and a device external to the controller 106. For example, information communicated between any of the modules of the controller 106 may include instructions and/or data. In some aspects, the bus 126 may be a universal serial bus.

In some aspects, the processor module 118 may comprise one or more processors, where each processor may perform different functions or execute different instructions and/or processes. For example, one or more processors may execute instructions for calculating an optimized condition, and one or more processors may execute instructions for input/output functions.

The memory module 124 may be random access memory ("RAM") or other dynamic storage devices for storing information and instructions to be executed by the processor module 118. The memory module 124 may also be used for storing temporary variables or other intermediate information during execution of instructions by the processor 118. In some aspects, the memory module 124 may comprise battery-powered static RAM, which stores information without requiring power to maintain the stored information. The storage module 120 may be a magnetic disk or optical disk and may also store information and instructions. In some aspects, the storage module 120 may comprise hard disk storage or electronic memory storage (e.g., flash memory). In some aspects, the memory module 124 and the storage module 120 are both a machine-readable medium.

The controller 106 may be coupled via the I/O module 122 to a user interface. For example, the user interface may include, for example, a keyboard or a mouse coupled to the controller 106 via the I/O module 122 for communicating information and command selections to the processor module 118. In addition, in its simplest form, the controller 106 may be just an on and off switch to turn on or off the plasma generation system, giving the crew of the aircraft 100 the flexibility to employ the plasma generation system.

According to various aspects of the subject disclosure, methods described herein are executed by the controller 106. Specifically, the processor module 118 may execute one or more sequences of instructions contained in the memory module 124 and/or the storage module 120. In one example, instructions may be read into the memory module 124 from another machine-readable medium, such as the storage module 120. In another example, instructions may be read directly into the memory module 124 from the I/O module 122. Execution of the sequences of instructions contained in the memory module 124 and/or the storage module 120 may be stored in the memory module 124 and/or the storage module 120 as one or more sequences of instructions. Information may be communicated from the processor module 118 to the memory module 124 and/or the storage module 120 via the bus 126 for storage. In some aspects, the information may be communicated from the processor module 118, the memory module 124, and/or the storage module 120 to the I/O module 122 via the bus 126. The information may then be communicated from the I/O module 122.

One or more processors in a multi-processing arrangement may also be employed to execute the sequences of instructions contained in the memory module 124 and/or the storage module 120. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium." as used herein, refers to any medium that participates in providing instructions to the processor module 118 for execution. Such a medium may take many forms, including, but not limited to, non-volatile media, volatile media, and transmission media. Non-volatile media include, for example, optical or magnetic disks, such as the storage module 120. Volatile media include dynamic memory, such as the memory module 124. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

Using the systems and methods described herein, the use of the plasma generator 102 may allow an incidence line of a transonic shock wave to be moved, allowing for more optimal for flight operations. Simultaneously, the plasma generator 102 may allow for a reduction in intensity of the transonic shock wave. The combination of intensity reduction and movement of the incidence line of the transonic shock wave may improve aerodynamic characteristics. Thus, it is believed that the use of the plasma generator 102 may improve the lift to drag ratio in a variety either by improving the lift, reducing the drag, or both.

The systems described herein may be integrally formed in the aircraft 100, or may be retrofitted into existing transport platforms and become cost effective over a very short interval of operation. Power requirements may be low, on the magnitude of a few kilowatts, such that the systems described herein are lightweight, fast responding, tunable, highly adaptable to flight conditions, with a low drag profile.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A method for enhancing operations of an aircraft, comprising the steps of:
   receiving information comprising a speed of the aircraft;
   determining, based on the information, that the aircraft is approaching transonic flight;
   in response to determining that the aircraft is approaching transonic flight, causing flow associated with the aircraft to remain locally subsonic that would otherwise be supersonic, the causing including activating, by a controller, a plasma generator positioned in or on the aircraft; and
   wherein the causing is performed in response to determining, by the controller based at least on the information including the speed of the aircraft, that activation of the plasma generator will mitigate a transonic shock wave.

2. The method of claim 1, wherein:
the method further comprises providing power to the plasma generator with a power source; and
the step of activating the plasma generator comprises transmitting a signal from the controller to the power source to provide the power to the plasma generator.

3. The method of claim 1, wherein the information further comprises information regarding altitude and temperature.

4. The method of claim 1, wherein:
the plasma generator comprises a plurality of plasma generators; and
the controller is further configured to activate at least a portion of the plurality of plasma generators in response to the information including the speed of the aircraft.

5. The method of claim 4, further comprising the steps of:
upon determining that activation of at least a portion of the plurality of plasma generators will mitigate a transonic shock wave, activating fewer than all of a portion of the plurality of plasma generators so as to mitigate a transonic shock wave.

6. The method of claim 4, wherein:
the controller is configured to independently activate each of the plurality of plasma generators;
the method further comprises providing power to at least one of the plurality of plasma generators with a power source; and
activating one of the plurality of plasma generators comprises transmitting a signal from the controller to the power source to provide the power to the at least one of the plurality of plasma generators.

7. The method of claim 4, wherein the controller is configured to determine, based on the information including the speed of the aircraft, whether activation of at least a portion of the plurality of plasma generators will enhance operations in an optimal configuration.

8. The method of claim 7, wherein: the optimal configuration comprises a fuel efficiency optimizing configuration; and the information further comprises information relating to fuel efficiency.

9. The method of claim 8, further comprising the step of:
calculating, with the controller and using the information relating to fuel efficiency, a fuel efficiency optimizing configuration.

10. The method of claim 1, wherein:
the plasma generator comprises a plurality of plasma generators; and
the controller is further configured to activate at least a portion of the plurality of plasma generators in order to achieve a balanced configuration for the aircraft, wherein the balanced configuration mitigates the transonic shock wave while improving a lift to drag ratio of the aircraft.

11. A system for enhancing operations of an aircraft, comprising:
a plasma generator comprising a pair of electrically coupled electrodes that are recessed in an exterior surface of the aircraft;
a sensor configured to sense and transmit information regarding the speed of the aircraft;
a controller configured to:
determine, based on the information from the sensor, that the aircraft is approaching transonic flight; and
in response to determining that the aircraft is approaching transonic flight, cause flow associated with the aircraft to remain locally subsonic that would otherwise be supersonic, the causing including activating the plasma generator, wherein the causing is performed in response to determining, by the controller based at least on the information regarding the speed of the aircraft, that activation of the plasma generator will mitigate a transonic shock wave; and
wherein the pair of electrically coupled electrodes provide an electric current to a plasma on the exterior surface that induces a local heating to surrounding air.

12. The system of claim 11, further comprising a power source configured to provide power to the plasma generator, wherein:
the controller is further configured to transmit a signal to the power source to provide power to the plasma generator only after determining, based on information regarding the speed of the aircraft that activation of the plasma generator would mitigate a transonic shock wave.

13. The system of claim 11, wherein:
the plasma generator comprises a plurality of plasma generators;
the controller is further configured to independently activate each of the plurality of plasma generators; and
the controller is further configured to activate a portion of the plurality of plasma generators only after determining, based on the information regarding the speed of the aircraft transmitted from the sensor, that activation of the portion of the plurality of plasma generators would mitigate a transonic shock wave.

14. The system of claim 13, wherein:
the plasma generator comprises a plurality of plasma generators;
the plurality of plasma generators are grouped in clusters; and
the controller is further configured to activate the plasma generators in a given cluster independently from the plasma generators in another cluster.

15. The system of claim 13, wherein:
the plasma generator comprises a plurality of plasma generators;
the controller is further configured to determine, based on the information transmitted from the sensors, whether a portion of the plurality of plasma generators would be activated in an optimal configuration; and
the controller is further configured to activate only the portion of the plurality of plasma generators that would be activated in the optimal configuration.

16. The system of claim 11, wherein the optimal configuration comprises a fuel efficiency optimizing configuration.

17. The system of claim 11, wherein the plasma generator is positioned on a wing of the aircraft.

* * * * *